United States Patent [19]
Hamano et al.

[11] Patent Number: 6,051,342
[45] Date of Patent: Apr. 18, 2000

[54] LITHIUM ION SECONDARY BATTERY AND METHOD OF FABRICATING THEREOF

[75] Inventors: Kouji Hamano; Yasuhiro Yoshida; Hisashi Shiota; Shou Shiraga; Shigeru Aihara; Michio Murai; Takayuki Inuzuka, all of Tokyo, Japan

[73] Assignee: Mitsubishi Denki Kabushiki Kaisha, Tokyo, Japan

[21] Appl. No.: 08/991,003

[22] Filed: Dec. 15, 1997

[30] Foreign Application Priority Data

Dec. 18, 1996 [JP] Japan .................................. 8-338240

[51] Int. Cl.[7] ........................................................ H01M 6/18
[52] U.S. Cl. ........................ 429/303; 429/231.95; 29/623.4
[58] Field of Search .............................. 429/127, 162, 429/247, 253, 303, 231.95; 29/623.4

[56] References Cited

U.S. PATENT DOCUMENTS

| | | |
|---|---|---|
| 5,437,692 | 8/1995 | Dasgupta et al. . |
| 5,456,000 | 10/1995 | Gozdz et al. . |
| 5,498,489 | 3/1996 | Dasgupta et al. . |
| 5,639,573 | 6/1997 | Oliver et al. ............... 429/303 |
| 5,658,685 | 8/1997 | Oliver ....................... 429/303 |
| 5,741,609 | 4/1998 | Chen et al. ............... 29/623.4 |
| 5,849,433 | 3/1997 | Venugopal et al. ....... 429/301 |

*Primary Examiner*—Maria Nuzzolillo
*Assistant Examiner*—Susy Tsang
*Attorney, Agent, or Firm*—Oblon, Spivak, McClelland, Maier & Neustadt, P.C.

[57] ABSTRACT

In a lithium ion secondary battery which is composed of a positive electrode 1, a negative electrode 4 and a separator 7 which contains a Li ion-containing non-aqueous electrolytic solution, both of the ionic conductivity and adhesion strength were ensured by making an adhesive resin layer 8 which bonds the positive electrode 1 to the separator 7 and the negative electrode 4 to the separator 7 into a mixture phase consisting of an electrolytic solution phase 9, an electrolytic solution-containing a polymer gel phase 10 and a polymer solid phase 11.

8 Claims, 2 Drawing Sheets

LITHIUM ION SECONDARY BATTERY AND METHOD OF FABRICATING THEREOF

DESCRIPTION OF THE BACKGROUND

1. Field of the Invention

This invention relates to a lithium ion secondary battery in which positive and negative electrodes face each other by sandwiching a separator which keeps electrolytes, more particularly to a thin lithium ion secondary battery having excellent charge and discharge characteristics.

2. Description of the Related Art

There is a growing demand for the miniaturization and lightening of portable electronic instruments. In order to realize such a demand, it is necessary to improve performance of batteries, such as large voltage, large energy density and tolerance for large load resistance, as well as optional shaping, secure safety and the like, so that development and improvement of various types of batteries are now in progress. Lithium ion battery is a secondary battery which can realize the highest voltage, largest energy density and tolerance for largest load factor resistance among existing batteries and is expected as a most probable candidate which will satisfy the aforementioned requirements.

As its main composing elements, the lithium ion secondary battery has a positive electrode, a negative electrode and an ion conducting layer inserted between these positive and negative electrodes. In the lithium ion secondary batteries which are now put into practical use, a plate-shaped material prepared by mixing powder of a lithium-cobalt oxide or the like active material with a binder resin together with powder of an electron conducting substance and coating the mixture on an aluminum collector is used as the positive electrode, and another plate-shaped material prepared by mixing powder of a carbonaceous active material with a binder resin and coating the mixture on a copper collector is used as the negative electrode. Also, a porous film such as of polyethylene, polypropylene or the like filled with a lithium ion-containing non-aqueous solution is used as the ion conducting layer.

In the currently available lithium ion secondary batteries, electric connection between positive electrode-ion conducting layer-negative electrode is maintained by pressurizing the system using a strong armor case made of stainless steel or the like. However, the just described armor case increases weight of the lithium ion secondary battery and causes difficulties not only in miniaturizing and lightening the battery but also in making it in optional shapes due to rigidity of the armor case.

In order to miniaturize and lighten the lithium ion secondary battery and to obtain its optional shapes, it is necessary to bond a positive electrode to an ion conducting layer, and a negative electrode to the ion conducting layer, and maintain such conditions without applying external pressure.

An example of such a method has been disclosed in U.S. Pat. No. 5,437,692 in which a lithium ion conducting polymer is used in an ion conducting layer, and a positive electrode and a negative electrode are bonded to the ion conducting layer using an adhesive layer containing a lithium compound. Also, a method in which a thermoplastic ion conducting layer is formed and positive and negative electrodes are bonded together using the thermoplastic ion conducting layer has been disclosed in WO 95/15,589.

However, by the aforementioned method disclosed in U.S. Pat. No. 5,437,692, sufficient bonding strength cannot be obtained and sufficiently thin shape as a battery cannot be obtained, and it also has a practical problem in terms of charge and discharge characteristics and the like battery characteristics due to large ionic conduction resistance between the ion conducting layer and positive and negative electrodes. Also, the aforementioned method of WO 95/15, 589 has problems in that sufficient bonding strength cannot be obtained because of the use of a thermoplastic ion conducting layer in the bonding and sufficiently thin shape cannot be formed as a battery.

SUMMARY OF THE INVENTION

The present invention has been accomplished with the aim of resolving the aforementioned problems and it contemplate providing a battery structure in which a positive electrode and a negative electrode are closely adhered to an ion conducting layer (to be referred to as separator hereinafter) by an adhesive resin, thereby securing sufficient bonding strength between the electrodes and separator, and ionic conduction resistance between the positive and negative electrodes and the ion conducting layer (to be referred to as separator hereinafter) electrode is simultaneously secured to the same level of conventional batteries which use armor cases.

A first aspect of the lithium ion secondary battery of the present invention is a battery which comprises a positive electrode, a negative electrode, a separator which keeps an electrolytic solution and has facing surfaces; and an adhesive resin layer which bonds each of said positive electrode and negative electrode to corresponding facing surface of said separator wherein the adhesive resin layer comprises a mixture phase consisting of an electrolytic solution phase, a polymer gel phase containing an electrolytic solution and a polymer solid phase.

A second aspect of the lithium ion secondary battery of the present invention is the battery according to the first aspect wherein the polymer gel phase and the polymer solid phase contain the same polymer materials, and average molecular weight of the polymer material contained in said polymer gel phase is less than average molecular weight of the polymer material contained in said polymer solid phase.

A third aspect of the lithium ion secondary battery of the present invention is the battery according to the first aspect wherein the polymer gel phase and the polymer solid phase contain the different polymer materials.

A fourth aspect of the lithium ion secondary battery of the present invention is the battery according to the third aspect wherein average molecular weight of the polymer material contained in said polymer gel phase is different from average molecular weight of the polymer material contained in said polymer solid phase.

A fifth aspect of the lithium ion secondary battery of the present invention is the battery according to the first aspect wherein the polymer gel phase and the polymer solid phase contain polyvinylidene fluoride, and average molecular weight of polyvinylidene fluoride contained in said polymer gel phase is less than average molecular weight of polyvinylidene fluoride contained in said polymer solid phase.

A sixth aspect of the method of fabricating a lithium ion secondary battery of the present invention is a method comprising the steps of: preparing an adhesive resin solution by dissolving a plurality of polymer materials having different average molecular weight; bonding each of a positive electrode and a negative electrode to corresponding facing surface of a separator by coating the adhesive resin solution to form an adhesive resin layer therebetween; and subsequently impregnating the adhesive resin layer with an electrolytic solution to make said adhesive resin layer into a mixture phase consisting of a polymer gel phase containing an electrolytic solution, a polymer solid phase and an electrolytic solution phase.

A seventh aspect of the method of fabricating a lithium ion secondary battery of the present invention according to the sixth aspect is a method wherein the impregnating step comprises the steps of: supplying an electrolytic solution to the adhesive resin layer; and heating the adhesive resin layer so as to make smaller average molecular weight of the polymer material to form polymer gel phase selectively, and other polymer material to form polymer solid phase.

An eighth aspect of the method of fabricating a lithium ion secondary battery of the present invention according to the seventh aspect is a method wherein the heating step comprises a step of: heating at a temperature within a range between a room temperature and 70° C.

A ninth aspect of the method of fabricating a lithium ion secondary battery of the present invention according to the eighth aspect is a method wherein the heating step comprises a step of: heating at a temperature within a range between a room temperature and 60° C.

In the above first drawing, 1 is a positive electrode, 2 is a positive electrode collector, 3 is a positive electrode active material layer, 4 is a negative electrode, 5 is a negative electrode collector, 6 is a negative electrode active material layer, 7 is a separator, 8 is an adhesive resin layer, 9 is an electrolytic solution phase, 10 is a polymer gel phase and 11 is a polymer solid phase.

DETAILED DESCRIPTION OF THE PREFERRED EMBODIMENT

The following describes the mode of carrying out the present invention in accordance with the drawings.

FIGS. 1(a) and (b) are sectional illustration of principal part showing a practical mode of the lithium ion secondary battery of the present invention, in which FIG. 1(b) is a partially enlarged view of the adhesive resin layer of FIG. 1(a).

Figure 1:
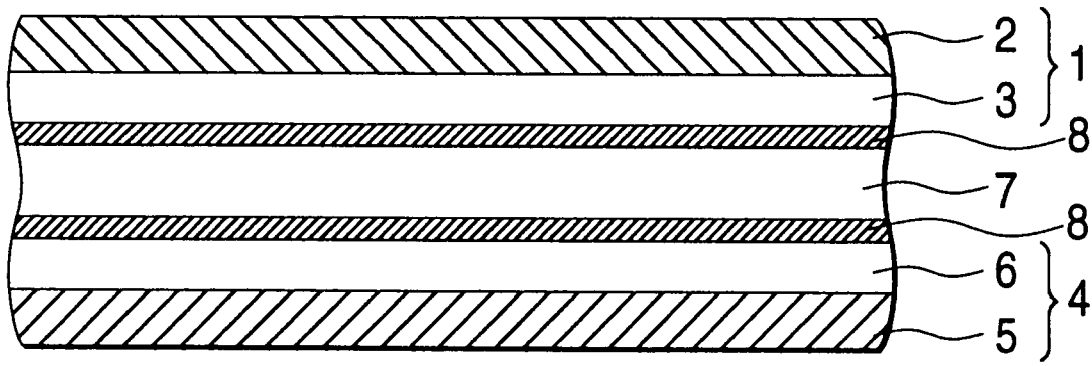
FIGS. 1(a) and (b) are sectional illustrations of the principal part showing an example of the mode of the lithium ion secondary battery of the present invention.
Figure 1:
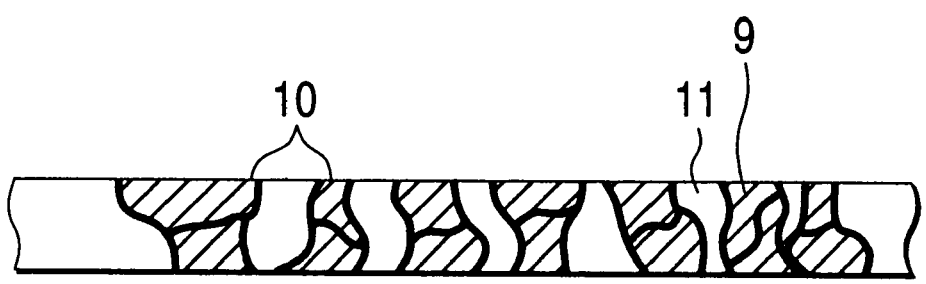

In FIG. 1(a), 1 is a positive electrode which is prepared by forming a positive electrode active material layer 3 on a positive electrode collector 2 made of aluminum foil or the like metal. The part 4 is a negative electrode which is prepared by forming a negative electrode active material layer 6 on a negative electrode collector 5 made of copper or the like metal. The part 7 is a separator which keeps a lithium ion-containing electrolytic solution, 8 is an adhesive resin layer which bonds the separator 7 to the positive electrode 1, and the separator 7 to the negative electrode 4, and, as shown in FIG. 1(b), the adhesive resin layer 8 comprises a mixture phase consisting of a polymer solid phase 11, a polymer gel phase 10 that contains an electrolytic solution and an electrolytic solution phase 9 which is kept in micropores formed with the polymer solid phase 11 or the polymer gel phase 10.

By the polymer solid phase 11 of the adhesive resin layer 8, one side of the facing surfaces of the separator 7 is strongly bonded (adhered) to the positive electrode 1, and the other side of the separator 7 also is strongly bonded (adhered) to the negative electrode 4. And large ionic conductivity is obtained by the electrolytic solution phase 9, and decrease in the bonding (adhesion) strength caused by compatibilization of the polymer solid phase 11 with the electrolytic solution phase 9 is repressed by the polymer gel phase 10. And the polymer gel phase 10 is also effective in keeping large ionic conductivity, thereby the ionic conductivity between the separator 7 and the positive electrode 1 and negative electrode 4 can be increased to a markedly high level.

In order to form the polymer solid phase 11 and polymer gel phase 10 in the adhesive resin layer 8, a resin which is prepared by dissolving polymer materials having different average molecular weight is used as an adhesive resin.

That is, an adhesive resin layer 8 which comprises a mixture phase consisting of a polymer solid phase 11 containing a large molecular weight polymer material, a polymer gel phase 10 containing a small molecular weight polymer material and an electrolytic solution phase 9 is formed, when an adhesive is prepared by uniformly dissolving a small molecular weight polymer material which swells by an electrolytic solution and a large molecular weight polymer material which does not swell by the electrolytic solution in an appropriate solvent, the positive electrode 1 and the negative electrode 4 are bonded to the separator 7 using the thus prepared adhesive and then the adhesive is thoroughly dried and impregnated with the electrolytic solution at a predetermined temperature.

The aforementioned polymer materials having different average molecular weight may be the same or different polymer materials. In the case of different polymer materials, the gel phase and solid phase can be formed by this combination even when they have the same average molecular weight, but it is desirable that they have different average molecular weight even in this case. The reason for this is that, when the polymer materials are different from each other but have similar molecular weight, the gel state changes periodically due to the formation of so-called "topological entanglement" in the solution system, so that there is a possibility that battery characteristics may also be changed.

These polymer materials to be used for the formation of the adhesive resin layer 8 must be at least those which are insoluble in the electrolytic solution and do not cause reactions in the lithium ion secondary battery. In addition to this, it is necessary that such materials are capable of forming gel phase and solid phase in the presence of the electrolytic solution, so that materials which satisfy these conditions can be used. Also, even in the case of the same polymer material, it can form each of the gel phase and solid phase depending on the type of solvent of the electrolytic solution or the temperature history when the lithium ion secondary battery is produced, and, for example, polymethylmethacrylate or the like acrylic ester polymer, polyacrylonitrile, small molecular weight polyvinylidene fluoride or a copolymer thereof with other large molecular weight compound may be used as the polymer material which can form a gel phase. Also, large molecular weight polyvinylidene fluoride, polytetrafluoroethylene or a copolymer thereof with other large molecular weight compound may be used as the polymer material which can form a solid phase.

Examples of the positive electrode active material to be used in the positive electrode active material layer 3 include complex oxides of lithium with cobalt, manganese, nickel and the like transition metals, lithium-containing chalcogen compounds or complex compounds thereof and these complex oxides, chalcogen compounds and complex compounds to which various elements are added. Also, a carbonaceous material or the like material through which lithium ions can go in and out may be used as the negative electrode active material to be used in the negative electrode active material layer 6.

As each of the positive electrode collector 2 and negative electrode collector 5, any metal can be used with the proviso that it is stable in the lithium ion secondary battery, and aluminum is used preferably as the positive electrode collector 2, and copper as the negative electrode collector 5. With regard to the shape of the collectors 2 and 5, any of foil, net, expanded metal and the like shapes can be used, of which net, expanded metal or the like shape which has a large surface area is desirable in order to obtain bonding strength with the active material layers 3 and 6 and to facilitate impregnation with the electrolytic solution after their bonding.

As the material to be used in the separator 7, any one of porous membranes, nets, non-woven fabric and the like insulating materials which can be impregnated with the electrolytic solution and can exert sufficient strength may be used, but it is desirable to use a porous membrane made of polypropylene, polyethylene or the like, from the view point of adhesiveness and safety. When a fluoride resin material is used, it is necessary in some cases to ensure its adhesiveness by a plasma treatment of its surface.

The electrolytic solution to be used may be prepared by dissolving $LiPF_6$, $LiClO_4$, $LiBF_4$, $LiCF_3SO_3$, $LiN(CF_3SO_2)_2$, $LiC(CF_3SO_2)_3$, $LiN(C_2F_5SO_2)_2$ or the like electrolyte in a single or mixture solvent selected from dimethoxyethane, diethoxyethane, dimethylether, diethylether and the like ether solvents and ethylene carbonate, propylene carbonate, diethyl carbonate, dimethyl carbonate and the like ester solvents.

[Embodiments]

The following illustratively describes embodiments of the lithium ion secondary battery of the present invention shown in FIG. 1.

Embodiment 1

(Preparation of positive electrode)

A positive electrode active material paste prepared by dispersing 87 parts by weight of $LiCoO_2$, 8 parts by weight of graphite powder and 5 parts by weight of polyvinylidene fluoride in N-methylpyrrolidone (to be referred to as NMP hereinafter) was coated to a thickness of 300 μm by doctor blade method to form a positive electrode active material thin film. An aluminum net having a thickness of 30 μm to be used as a positive electrode collector was put on the film, and the positive electrode active material paste was again coated further thereon to a thickness of 300 μm by the doctor blade method. This was made into a half-dried state by allowing it to stand for 60 minutes in a dryer of 60° C., thereby forming a laminate of the positive electrode collector 2 and the positive electrode active material. By rolling this laminate to 400 μm, the positive electrode 1 in which the positive electrode active material layer 3 has been formed was prepared. When the thus prepared positive electrode 1 was soaked in an electrolytic solution and then peel strength between the positive electrode active material layer and the positive electrode collector was measured, a value of 20 to 25 gf/cm was obtained.

(Preparation of negative electrode)

A negative electrode active material paste prepared by dispersing 95 parts by weight of Meso Phase Microbeads Carbon (manufactured by Osaka Gas) and 5 parts by weight of polyvinylidene fluoride in NMP was coated to a thickness of 300 μm by doctor blade method to form a negative electrode active material thin film. A copper net having a thickness of 20 μm to be used as a negative electrode collector was put on the film, and the negative electrode active material paste was again coated further thereon to a thickness of 300 μm by the doctor blade method. This was made into a half-dried state by allowing it to stand for 60 minutes in a dryer of 60° C., thereby forming a laminate of the negative electrode collector 5 and the negative electrode active material. By rolling this laminate to 400 μm, the negative electrode 4 in which the negative electrode active material layer 6 has been formed was prepared.

When the thus prepared negative electrode 4 was soaked in an electrolytic solution and then peel strength between the negative electrode active material layer 6 and the negative electrode collector 5 was measured, a value of 5 to 10 gf/cm was obtained.

(Preparation of adhesive agent)

A mixture consisting of 3.0 parts by weight of poly (methylmethacrylate) having an average molecular weight (Mw) of 350,000 (manufactured by Aldrich), 2.0 parts by weight of polyvinylidene fluoride having an average molecular weight (Mw) of 534,000 (manufactured by Aldrich) and 95 parts by weight of NMP in that compositional ratio was thoroughly stirred until the mixture became uniform solution, thereby preparing a viscous adhesive agent.

(Preparation of battery)

The adhesive agent prepared in the above step was coated on both sides of a porous polypropylene sheet (trade name Cell Guard #2400, manufactured by Hoechst) to be used as the separator 7. Thereafter, and before the adhesive agent was dried, the positive electrode and the negative electrode were adhered and laminated together in such a manner that they faced each other by sandwiching the separator, thus preparing a battery laminate in which the positive electrode 1, the separator 7 and the negative electrode 4 were bonded. The thus laminated battery laminate was allowed to stand for 2 hours in a hot air oven of 60° C. to evaporate NMP. By the evaporation of NMP from the adhesive agent, it becomes a porous membrane having continuous holes. Subsequently, at room temperature, into the thus treated electrode laminate was injected an electrolytic solution which has been prepared by dissolving 1.0 mol/dm³ in concentration of $LiPF_6$ (manufactured by Tokyo Kasei) in a mixture solvent (1:1 in molar ratio) consisting of ethylene carbonate (manufactured by Kanto Chemical) and 1,2-dimethoxyethane (manufactured by Wako Pure Chemical Industries).

Next, the peel strength between the positive electrode active material layer 3 and the separator 7 and the negative electrode active material layer 6 and the separator 7 was measured (by the measuring method of JIS K6854) to find respective values of 25 to 30 gf/cm and 15 to 20 gf/cm. Thereafter, a lithium ion secondary battery was completed by packing the electrolytic solution-injected electrode laminate with an aluminum laminate film and sealing the opening by hot melting treatment.

By standing the injected electrode laminate for 60 minutes at the room temperature, adhesive resin layer 8 consist of a polymer solid phase 11 containing a large molecular weight polymer material, a polymer gel phase 10 containing a small molecular weight polymer material and an electrolytic solution phase 9 is formed. Preferably the injected electrode laminate can be heated at the temperature lower than 50° C. for 60 minutes before packing. More preferably the injected electrode laminate can be heated at the temperature lower than 60° C. for 3,4 minutes before packing. In the adhesive resin layer 8 of the embodiment 1, the ratio of polymer gel phase 10 for polymer solid phase 11 is 3:2.

Embodiment 2

A lithium ion secondary battery was prepared by repeating the method of Embodiment 1, with only one exception that the preparation method of adhesive agent was changed as follows.

(Preparation of adhesive agent)

A mixture consisting of 3.0 parts by weight of poly(acrylonitrile) having an average molecular weight (Mw) of 86,200 (manufactured by Aldrich), 2.0 parts by weight of polyvinylidene fluoride having an average molecular weight (Mw) of 534,000 (manufactured by Aldrich) and 95 parts by weight of NMP in that compositional ratio was thoroughly stirred until the mixture became uniform solution, thereby preparing a viscous adhesive agent.

Embodiment 3

A lithium ion secondary battery was prepared by repeating the method of Embodiment 1, with only one exception that the preparation method of adhesive agent was changed as follows.

(Preparation of adhesive agent)

A mixture consisting of 2.5 parts by weight of polyvinylidene fluoride having an average molecular weight (Mw) of 180,000 (manufactured by Aldrich), 2.5 parts by weight of polyvinylidene fluoride having an average molecular weight (Mw) of 534,000 (manufactured by Aldrich) and 95 parts by weight of NMP in that compositional ratio was thoroughly stirred until the mixture became uniform solution, thereby preparing a viscous adhesive agent.

Embodiment 4

A lithium ion secondary battery was prepared by repeating the method of Embodiment 1, with only one exception that the preparation method of adhesive agent was changed as follows.

(Preparation of adhesive agent)

A mixture consisting of 3.5 parts by weight of polyvinylidene fluoride having an average molecular weight (Mw) of 180,000 (manufactured by Aldrich), 3.5 parts by weight of polyvinylidene fluoride having an average molecular weight (Mw) of 534,000 (manufactured by Aldrich) and 93 parts by weight of NMP in that compositional ratio was thoroughly stirred until the mixture became uniform solution, thereby preparing a viscous adhesive agent.

Embodiment 5

A lithium ion secondary battery was prepared by repeating the method of Embodiment 1, with only one exception that the preparation method of adhesive agent was changed as follows.

(Preparation of adhesive agent)

A mixture consisting of 5.0 parts by weight of polyvinylidene fluoride having an average molecular weight (Mw) of 180,000 (manufactured by Aldrich), 5.0 parts by weight of polyvinylidene fluoride having an average molecular weight (Mw) of 534,000 (manufactured by Aldrich) and 90 parts by weight of NMP in that compositional ratio was thoroughly stirred until the mixture became uniform solution, thereby preparing a viscous adhesive agent.

Embodiment 6

A lithium ion secondary battery was prepared by repeating the method of Embodiment 1, with only one exception that the preparation method of adhesive agent was changed as follows.

(Preparation of adhesive agent)

A mixture consisting of 2.5 parts by weight of polyvinylidene fluoride having an average molecular weight (Mw) of 180,000 (manufactured by Aldrich), 2.5 parts by weight of polyvinylidene fluoride having an average molecular weight (Mw) of 534,000 (manufactured by Aldrich) and 90 parts by weight of NMP in that compositional ratio was thoroughly stirred until the mixture became uniform solution, thereby preparing a viscous adhesive agent.

(Preparation of battery)

The adhesive agent prepared in the above step was coated on both sides of a porous polypropylene sheet (trade name Cell Guard #2400, manufactured by Hoechst) to be used as the separator 7. Thereafter, and before the adhesive agent was dried, the positive electrode and the negative electrode were adhered and laminated together in such a manner that they faced each other by sandwiching the separator, thus preparing a electrode laminate. The thus electrode laminate was allowed to stand for 2 hours in a hot air oven of 60° C. to evaporate NMP. By the evaporation of NMP from the adhesive agent, it becomes a porous membrane having continuous holes. Subsequently, at room temperature, into the thus treated electrode laminate was injected an electrolytic solution which has been prepared by dissolving 1.0 mol/dm$^3$ in concentration of LiPF$_6$ (manufactured by Tokyo Kasei) in a mixture solvent (1:1 in molar ratio) consisting of ethylene carbonate (manufactured by Kanto Chemical) and diethyl carbonate (manufactured by Wako Pure Chemical Industries).

Embodiment 7

A lithium ion secondary battery was prepared by repeating the method of Embodiment 6 except that the preparation method of adhesive agent was changed as follows.

(Preparation of adhesive agent)

A mixture consisting of 3.5 parts by weight of polyvinylidene fluoride having an average molecular weight (Mw) of 180,000 (manufactured by Aldrich), 3.5 parts by weight of polyvinylidene fluoride having an average molecular weight (Mw) of 534,000 (manufactured by Aldrich) and 93 parts by weight of NMP in that compositional ratio was thoroughly stirred until the mixture became uniform solution, thereby preparing a viscous adhesive agent.

Embodiment 8

A lithium ion secondary battery was prepared by repeating the method of Embodiment 6, except that the preparation method of adhesive agent was changed as follows.

(Preparation of adhesive agent)

A mixture consisting of 5.0 parts by weight of polyvinylidene fluoride having an average molecular weight (Mw) of 180,000 (manufactured by Aldrich), 5.0 parts by weight of polyvinylidene fluoride having an average molecular weight (Mw) of 534,000 (manufactured by Aldrich) and 93 parts by weight of NMP in that compositional ratio was thoroughly stirred until the mixture became uniform solution, thereby preparing a viscous adhesive agent.

Embodiment 9

A lithium ion secondary battery was prepared by repeating the method of Embodiment 1, except that the preparation method of adhesive agent was changed as follows and the injection temperature of the electrolytic solution in producing the battery was changed to 70° C. as shown below.

(Preparation of adhesive agent)

A mixture consisting of 2.5 parts by weight of polyvinylidene fluoride having an average molecular weight (Mw) of 180,000 (manufactured by Aldrich), 2.5 parts by weight of polyvinylidene fluoride having an average molecular weight (Mw) of 534,000 (manufactured by Aldrich) and 95 parts by weight of NMP in that compositional ratio was thoroughly stirred until the mixture became uniform solution, thereby preparing a viscous adhesive agent.

(Preparation of battery)

The adhesive agent prepared in the above step was coated on both sides of a porous polypropylene sheet (trade name Cell Guard #2400, manufactured by Hoechst) to be used as the separator 7. Thereafter, and before the adhesive agent was dried, the positive electrode and the negative electrode were adhered and laminated together in such a manner that they faced each other by sandwiching the separator, thus preparing a electrode laminate. The thus electrode laminate was allowed to stand for 2 hours in a hot air oven of 60° C. to evaporate NMP. By the evaporation of NMP from the adhesive agent, it becomes a porous membrane having continuous holes (micropores). Subsequently, at 70° C., into the thus treated electrode laminate was injected an electrolytic solution which has been prepared by dissolving 1.0 mol/dm$^3$ in concentration of LiPF$_6$ (manufactured by Tokyo Kasei) in a mixture solvent (1:1 in molar ratio) consisting of ethylene carbonate (manufactured by Kanto Chemical) and diethyl carbonate (manufactured by Wako Pure Chemical Industries).

COMPARATIVE EXAMPLE 1

A lithium ion secondary battery was prepared by repeating the method of Embodiment 1, with only one exception that the preparation method of adhesive agent was changed as follows.

(Preparation of adhesive agent)

A mixture consisting of 5.0 parts by weight of poly (methylmethacrylate) having an average molecular weight (Mw) of 350,000 (manufactured by Aldrich) and 95 parts by weight of NMP in that compositional ratio was thoroughly stirred until the mixture became uniform solution, thereby preparing a viscous adhesive agent.

COMPARATIVE EXAMPLE 2

A lithium ion secondary battery was prepared by repeating the method of Embodiment 1, with only one exception that the preparation method of adhesive agent was changed as follows.

(Preparation of adhesive agent)

A mixture consisting of 5.0 parts by weight of poly (acrylonitrile) having an average molecular weight (Mw) of 86,200 (manufactured by Aldrich) and 95 parts by weight of NMP in that compositional ratio was thoroughly stirred until the mixture became uniform solution, thereby preparing a viscous adhesive agent.

COMPARATIVE EXAMPLE 3

A lithium ion secondary battery was prepared by repeating the method of Embodiment 1, with only one exception that the preparation method of adhesive agent was changed as follows.

(Preparation of adhesive agent)

A mixture consisting of 5.0 parts by weight of polyvinylidene fluoride having an average molecular weight (Mw) of 180,000 (manufactured by Aldrich) and 95 parts by weight of NMP in that compositional ratio was thoroughly stirred until the mixture became uniform solution, thereby preparing a viscous adhesive agent.

COMPARATIVE EXAMPLE 4

A lithium ion secondary battery was prepared by repeating the method of Embodiment 1, with only one exception that the preparation method of adhesive agent was changed as follows.

(Preparation of adhesive agent)

A mixture consisting of 5.0 parts by weight of polyvinylidene fluoride having an average molecular weight (Mw) of 534,000 (manufactured by Aldrich) and 95 parts by weight of NMP in that compositional ratio was thoroughly stirred until the mixture became uniform solution, thereby preparing a viscous adhesive agent.

COMPARATIVE EXAMPLE 5

A lithium ion secondary battery was prepared by repeating the method of Embodiment 1, except that the same adhesive agent of Embodiments 6 and 9 was used and the injection temperature of the electrolytic solution in producing the battery was changed to 100° C. as shown below.

(Preparation of battery)

The aforementioned adhesive agent was coated on both sides of a porous polypropylene sheet (trade name Cell Guard #2400, manufactured by Hoechst) to be used as the separator 7. Thereafter, and before the adhesive agent was dried, the positive electrode and the negative electrode were adhered and laminated together in such a manner that they faced each other by sandwiching the separator, thus preparing a electrode laminate. The thus electrode laminate was allowed to stand for 2 hours in a hot air oven of 60° C. to evaporate NMP. By the evaporation of NMP from the adhesive agent, it becomes a porous membrane having continuous holes. Subsequently, at 100° C., into the thus treated electrode laminate was injected an electrolytic solution which has been prepared by dissolving 1.0 mol/dm$^3$ in concentration of LiPF$_6$ (manufactured by Tokyo Kasei) in a mixture solvent (1:1 in molar ratio) consisting of ethylene carbonate (manufactured by Kanto Chemical) and diethyl carbonate (manufactured by Wako Pure Chemical Industries).

Figure 2:
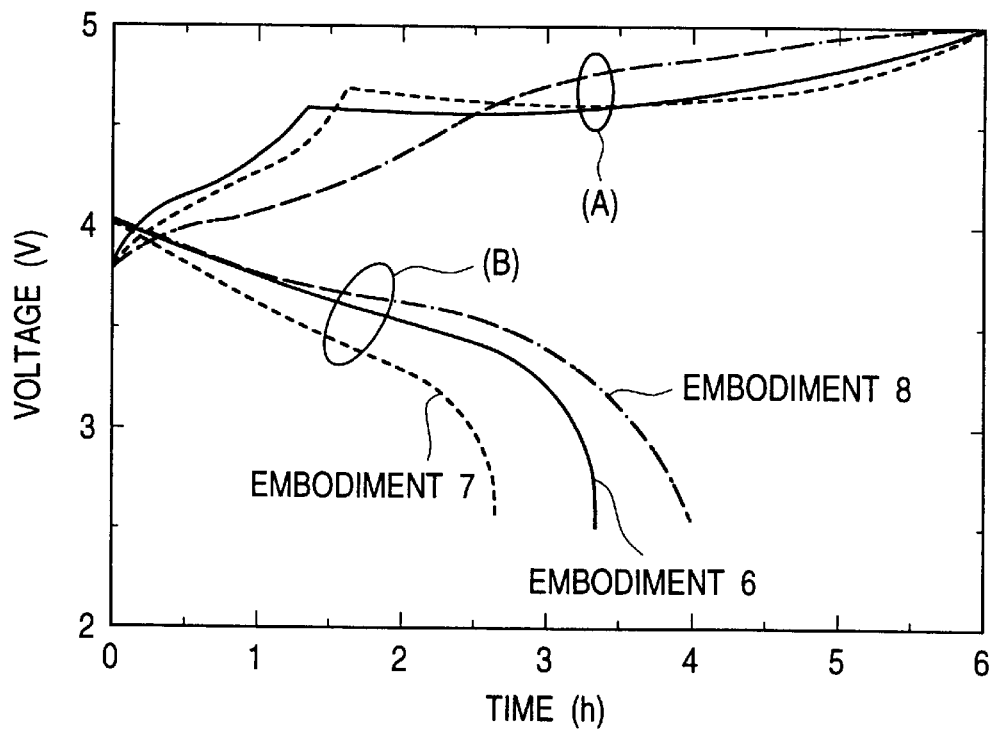
FIG. 2 is a graph showing overcharge characteristics and subsequent discharge characteristics of an example of the lithium ion secondary battery of the present invention.
Figure 3:
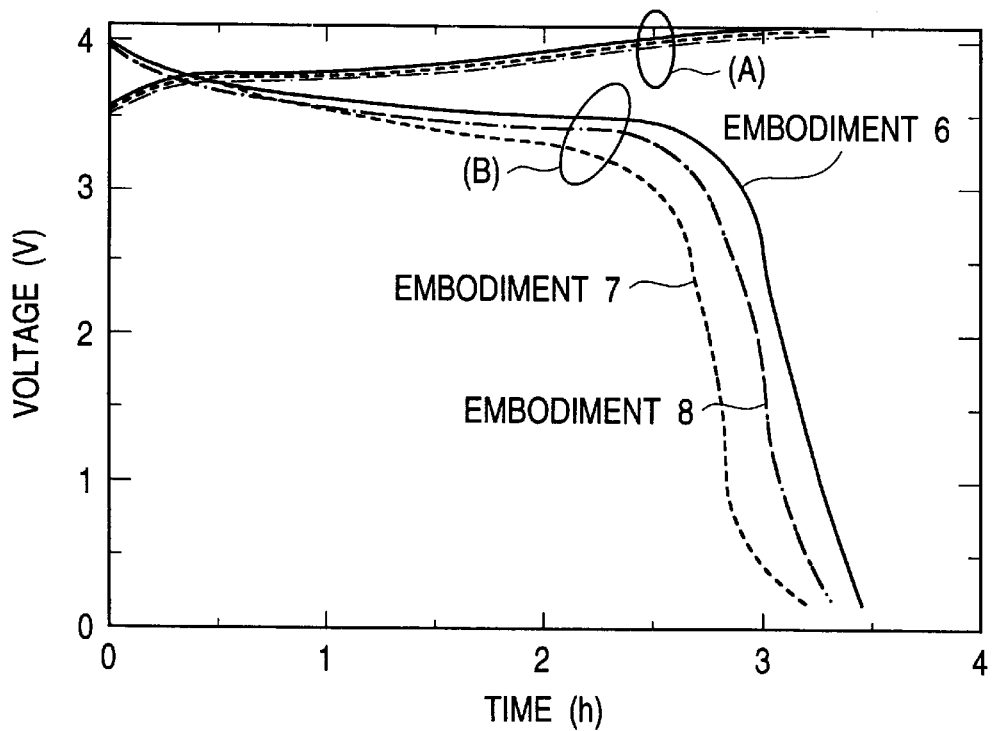
FIG. 3 is a graph showing over discharge characteristics and subsequent charge characteristics of an example of the lithium ion secondary battery of the present invention.

Characteristics of the lithium ion secondary batteries obtained in the aforementioned Embodiments 1 to 9 and Comparative Examples 1 to 5 were evaluated. Table 1 shows results of the measurement of cell resistance of each battery, together with the adhesive strength (peel strength) between the positive electrode active material and the separator and the negative electrode active material and the separator. FIG. 2 shows results of an overcharge (200% charge) test and FIG. 3 shows results of an over discharge test, in which (A) shows charge characteristics and (B) shows discharge characteristics. Though each of these drawings shows the results obtained using the lithium batteries of the aforementioned Embodiments 6 to 8, similar results were obtained by other Embodiments.

TABLE 1

| | Peel strength (gf/cm) | | |
|---|---|---|---|
| | Positive electrode/ Separator | Negative electrode/ Separator | Resistance (Ω)* |
| Inv. Ex. | | | |
| 1 | 17 | 9 | 24 |
| 2 | 15 | 9 | 23 |
| 3 | 20 | 13 | 21 |
| 4 | 22 | 33 | 25 |
| 5 | 21 | 52 | 30 |
| 6 | 25 | 15 | 20 |
| 7 | 24 | 29 | 22 |

TABLE 1-continued

| | Peel strength (gf/cm) | | |
| --- | --- | --- | --- |
| | Positive electrode/ Separator | Negative electrode/ Separator | Resistance (Ω)* |
| 8 | 28 | 44 | 29 |
| 9 | 26 | 16 | 20 |
| Comp. Ex. 1 | 0 (not measurable) | 0 (not measurable) | not measurable |
| Comp. Ex. 2 | 0 (not measurable) | 0 (not measurable) | not measurable |
| Comp. Ex. 3 | 0 (not measurable) | 0 (not measurable) | not measurable |
| Comp. Ex. 4 | 31 | 33 | 150 |
| Comp. Ex. 5 | 0 (not measurable) | 0 (not measurable) | not measurable |

*Cell electrical resistance

As is evident from the results shown in Table 1, the lithium ion secondary batteries of Comparative Examples 1 to 3 showed hardly measurable peel strength values of close to zero. Since each of the adhesive agents used in Comparative Examples 1 to 3 swells by the electrolytic solution and is composed of the electrolytic solution and a polymer gel phase which contains the electrolytic solution, it seemed that the ionic conductivity could be ensured, but the adhesion strength could not be ensured so that it was difficult to measure the cell electrical resistance.

Also, the lithium ion secondary battery of Comparative Example 4 shows a large peel strength value, but its ionic conductivity is not ensured due to large cell electrical resistance. Since the adhesive agent used in Comparative Example 4 does not swell by the electrolytic solution, its adhesion strength is ensured, but its ionic conductivity becomes small due to inclusion of the electrolytic solution in the solid polymer phase.

In addition, the lithium ion secondary battery of Comparative Example 5 showed a hardly measurable peel strength value of close to zero, so that its cell electrical resistance was not measurable. In Comparative Example 5, the same composition of Embodiments 6 and 9 was used as the adhesive agent, but injection temperature of the electrolytic solution was increased to 100° C., so that the polymer which does not swell at low temperature was swollen and, as a consequence, its ionic conductivity was ensured but the adhesive strength was not, similar to the case of Comparative Example 1 to 3.

In the lithium ion secondary batteries of Embodiments 1 to 9, on the other hand, both of their ionic conductivity and adhesion strength were ensured with a cell electrical resistance of 20 to 30 Ω and a peel strength of 8 to 52 gf/cm. In Embodiments 1 to 9, a mixture phase is formed from an electrolytic solution-containing polymer gel phase and a polymer solid phase, so that the ionic conductivity is ensured by the electrolytic solution-containing polymer gel phase and the adhesion strength is ensured by the polymer solid phase.

Also, when increment of temperature occurs during the use of these batteries caused by an abnormal phenomenon generated by a certain cause, the polymer solid phase swells by the electrolytic solution and, as the result, the current is cut off due to peeling between the electrodes and separator, so that such an effect is desirable from the viewpoint of ensuring safety.

In addition, as shown in FIG. 2, the discharge characteristics (curve (B)) after overcharging (curve (A)) were excellent, and the charge characteristics (curve (A)) after over discharging (curve (B)) were also excellent as shown in FIG. 3.

As has been described in the foregoing, according to the lithium ion secondary battery of the present invention, it comprises a positive electrode, a negative electrode, a separator which keeps an electrolytic solution and has facing surfaces and an adhesive resin layer which bonds each of said positive electrode and negative electrode to corresponding facing surface of said separator, and said adhesive resin layer comprises a mixture phase consisting of a polymer gel phase containing an electrolytic solution, a polymer solid phase and an electrolytic solution phase, so that both of the adhesion strength and ionic conductivity between the positive and negative electrodes and the separator can be ensured and a practicable lithium ion secondary battery can be obtained which does not require a strong armor case, can be made into thin and optional shapes and has large charge and discharge efficiency.

Also, the polymer gel phase and the polymer solid phase can be formed by including the same or different polymer materials in the polymer gel phase and the polymer solid phase, in which average molecular weight of the polymer material included in said polymer gel phase is different from average molecular weight of the polymer material included in said polymer solid phase.

It is particularly effective when the polymer gel phase and the polymer solid phase contain polyvinylidene fluoride, and average molecular weight of polyvinylidene fluoride contained in said polymer gel phase is different from average molecular weight of polyvinylidene fluoride contained in said polymer solid phase, in terms of ensuring both of the adhesion strength and ionic conductivity between the positive and negative electrodes and the separator.

In addition, both of the adhesion strength and ionic conductivity between the positive and negative electrodes and the separator can be ensured and a practicable lithium ion secondary battery can be obtained which does not require a strong armor case, can be made into thin and optional shapes and has excellent charge and discharge efficiency, by bonding each of the positive electrode and the negative electrode to corresponding facing surface of the separator using an adhesive agent prepared by dissolving a plurality of the polymer materials having different average molecular weight in a solvent, thereby forming an adhesive resin layer between each of said facing surfaces, and subsequently impregnating the adhesive resin layer with an electrolytic solution to make said adhesive resin layer into a mixture phase consisting of a polymer gel phase containing an electrolytic solution, a polymer solid phase and an electrolytic solution phase.

What is claimed is:

1. A lithium ion secondary battery comprising:
    a positive electrode;
    a negative electrode;
    a separator which keeps an electrolytic solution and has facing surfaces; and
    an adhesive resin layer which bonds each of said positive electrode and negative electrode to a corresponding facing surface of said separator,
    wherein the adhesive resin layer comprises a mixture phase consisting of an electrolytic solution phase, a polymer gel phase containing an electrolytic solution, and a polymer solid phase; and
    wherein (1) the polymer gel phase and the polymer solid phase contain the same polymer materials, and a weight average molecular weight of the polymer material contained in said polymer gel phase is less than a weight average molecular weight of the polymer material contained in said polymer solid phase, or (2) the polymer gel phase and the polymer solid phase contain different polymer materials, and a weight average molecular weight of the polymer material contained in said polymer gel phase is different from a weight average molecular weight of the polymer material contained in said polymer solid phase.

2. The lithium ion secondary battery according to claim 1, wherein the polymer gel phase and the polymer solid phase contain polyvinylidene fluoride, and a weight average molecular weight of polyvinylidene fluoride contained in said polymer gel phase is less than a weight average molecular weight of polyvinylidene fluoride contained in said polymer solid phase.

3. The lithium ion secondary battery according to claim 1, wherein the polymer gel phase and the polymer solid phase contain different polymer materials.

4. The lithium ion secondary battery according to claim 1, wherein the weight average molecular weight of the polymer material contained in said polymer gel phase is less than the weight average molecular weight of the polymer material contained in said polymer solid phase.

5. A method of fabricating a lithium ion secondary battery, comprising:

preparing an adhesive resin solution by dissolving a plurality of polymer materials having different weight average molecular weights;

bonding each of a positive electrode and a negative electrode to a corresponding facing surface of a separator by coating the adhesive resin solution to form an adhesive resin layer therebetween;

subsequently impregnating the adhesive resin layer with an electrolytic solution to make said adhesive resin layer into a mixture phase consisting of a polymer gel phase containing an electrolytic solution, a polymer solid phase, and an electrolytic solution phase; and forming the lithium ion secondary battery of claim 1.

6. The method of fabricating a lithium ion secondary battery according to claim 5, wherein the impregnating comprises supplying an electrolytic solution to the adhesive resin layer; and heating the adhesive resin layer to selectively reduce a weight average molecular weight of the polymer material forming the polymer gel phase.

7. The method of fabricating a lithium ion secondary battery according to claim 6, wherein the heating comprises heating between room temperature and 70° C.

8. The method of fabricating a lithium ion secondary battery according to claim 7, wherein the heating comprises heating between room temperature and 60° C.

* * * * *